US006851301B2

(12) United States Patent
Kim et al.

(10) Patent No.: US 6,851,301 B2
(45) Date of Patent: Feb. 8, 2005

(54) CANTILEVER FOR SCANNING PROBE MICROSCOPE

(75) Inventors: Young Sik Kim, Seoul (KR); Hyo Jin Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/151,102

(22) Filed: May 21, 2002

(65) Prior Publication Data

US 2002/0174715 A1 Nov. 28, 2002

(30) Foreign Application Priority Data

May 23, 2001 (KR) .................................. P2001-0028403

(51) Int. Cl.[7] .......................... G01B 5/28; G01N 13/16
(52) U.S. Cl. ........................ 73/105; 73/104; 250/306
(58) Field of Search ...................... 73/104, 105; 250/306

(56) References Cited

U.S. PATENT DOCUMENTS

| 5,276,672 | A | * | 1/1994 | Miyazaki et al. | ........... 369/126 |
| 5,321,685 | A | * | 6/1994 | Nose et al. | .................. 369/129 |
| 5,354,985 | A | * | 10/1994 | Quate | ......................... 250/234 |
| 5,444,244 | A | * | 8/1995 | Kirk et al. | ................... 250/306 |
| 5,883,705 | A | * | 3/1999 | Minne et al. | .................. 355/71 |
| 5,936,237 | A | * | 8/1999 | van der Weide | ............ 250/234 |
| 6,383,823 | B1 | * | 5/2002 | Takahashi et al. | ............ 438/14 |
| 6,392,934 | B1 | * | 5/2002 | Saluel et al. | ........... 365/189.01 |
| 6,422,069 | B1 | * | 7/2002 | Shimizu et al. | ............... 73/105 |
| 6,477,132 | B1 | * | 11/2002 | Azuma et al. | ............. 369/126 |
| 2001/0028033 | A1 | * | 10/2001 | Shimizu et al. | ............. 250/309 |
| 2002/0092359 | A1 | * | 7/2002 | Lange et al. | .................. 73/779 |

FOREIGN PATENT DOCUMENTS

JP          8-35976          2/1996

OTHER PUBLICATIONS

Tortonese et al., "Atomic Force Microscopy Using A Piezoresistive Cantilever", 1991, IEEE, International Conference on Solid–State Sensors and Actuators, Digest of Technical Papers, pp. 448–449.*

Tortonese et al., Atomic Resolution with an Atomic Force Microscope Using Piezoresistive Detection, Feb. 22, 1993, American Institute of Physics, vol. 62, No. 8, pp. 834–836.*

* cited by examiner

*Primary Examiner*—Hezron Williams
*Assistant Examiner*—David A. Rogers
(74) *Attorney, Agent, or Firm*—Fleshner & Kim, LLP

(57) ABSTRACT

Cantilever for a scanning probe microscope (SPM) including a substrate having a tip, a piezoactuator on the substrate movable in response to an external electric signal, and a sensor formed around the piezoactuator so as not to overlap with the piezoactuator, thereby minimizing inner couplings.

25 Claims, 15 Drawing Sheets

CANTILEVER FOR SCANNING PROBE MICROSCOPE

This application claims the benefit of the Korean Application No. P2001-0028403 filed on May 23, 2001, which are hereby incorporated by reference.

BACKGROUND OF THE INVENTION

1. Field of the Invention

The present invention relates to a scanning probe microscope, and more particularly, to a cantilever for a scanning probe microscope (SPM), which minimizes an inner coupling.

2. Background of the Related Art

In general, of the SPM, AFM (atomic force microscope) and the like uses a micro-machined cantilever. The cantilever is flexible in up and down directions, and has a probe with a sharp tip of a size of a few atoms.

When the probe is brought close to a surface of a test piece, there is an attractive or repulsive force exerting between the atoms at the tip of the probe and the atoms on the surface of the test piece according to a distance between the two. The AFM is a device that senses the force, and, currently, the principle is also applied to nano-lithographies, data storage systems, and the like.

Of the various operation modes of the AFM, the repulsive force is used in a case of a contact mode, and, though the force is very fine in a range of approx. 1–10nN, the force bends the cantilever as the cantilever is also very sensitive.

In order to measure an up or down direction bending of the cantilever, a laser beam is directed to the cantilever, and an angle of the laser beam reflected at a top surface is measured by a photodiode.

Such a movement of the tip of the cantilever is fed back to a piezotube driver, to sustain the bending of the cantilever, and, also fix the distance between the tip and the test piece, thereby permitting measurement of a shape of the test piece.

However, the sensing device employing the laser and the photodiode has disadvantages of requiring complicated and precise devices. Consequently, for solving the problem, even a method is suggested, in which a sensing device is employed, which has an integrated piezoresistor on the cantilever.

Moreover, the AFM requires too much time in measuring the test piece, which is the greatest obstacle in etching devices and data storages having the AFMs applied thereto. A major reason of the AFM requiring much time in measuring the test piece is a poor mechanical responsive efficiency, and a very low resonance frequency. Therefore, for solving the problem, even a technology is suggested, in which, instead of the piezotubes, piezoelectric actuators are integrated on a base of the cantilever.

Recently, a cantilever for an AFM is suggested, in which piezoresistor sensors and piezoelectric actuators are integrated. FIG. 1A illustrates a perspective view of a related art cantilever having piezoresistor sensors and piezoelectric actuators integrated thereon, FIG. 1B illustrates a section across a line I—I in FIG. 1A, FIG. 1C illustrates a section across a line II—II in FIG. 1A, and FIG. 1D illustrates a plan view of FIG. 1A.

Referring to FIGS. 1A–1D, the related art cantilever 7 of silicon is provided with a sensing part 6 having a coat of boron for serving as a piezoresistor, and a sensing signal transmitting part 5 for transmitting an electric signal to the piezoresistor.

The silicon cantilever is heavily doped with boron so that a mechanical stress occurred at the actuator does not cause an unnecessary electric signal at the sensing signal transmitting part 5.

An insulating film 4 is formed on the silicon cantilever having the sensors integrated thereon for electric insulation, and a ferroelectrics capacitor, an actuator operation part, is formed thereon in a structure of a lower electrode 3—a ferroelectrics 2, an upper electrode 1.

Referring to FIG. 1B–1C, a Cpzt represents an equivalent capacitor of the ferroelectrics in the actuator, Cox represents a parasitic capacitor composed of the lower electrode 3—the insulating film 4—the silicon cantilever 7, Cj represents a parasitic capacitor caused by a depletion layer formed between the p-type sensing signal transmitting part 5 and the n-type silicon cantilever 7, Rpt represents a resistance of the lower electrode 3 of the actuator, Rpiezo represents a resistance of the sensing part 6, and Rp+ represents a resistance of the sensing signal transmitting part 5. A π-model, which is used frequently in an equivalent model, is applied in preparing the foregoing model, and Cox and Cj are divided into two, to have Cov/2 and Cj/2.

The foregoing related art cantilever can not avoid electric coupling caused by the parasitic capacitors Cov1 and Cov2 formed at the lower electrode 3 of the ferroelectrics capacitor and the sensing signal transmitting part 5 and the resistance Rp+ at the sensing signal transmitting part.

In general, in the coupling, there are a mechanical coupling, and an electric coupling. In the mechanical coupling, a stress occurred by a mechanical action of the actuator is transmitted to the silicon cantilever, and the stress is converted into an electric signal by the piezoresistive phenomenon of the silicon, and acts as a noise of the electric signal. In the electric coupling, the parasitic capacitors, and parasitic resistors between electric signal lines cause crosstalk, to form an electric noise. Since such noises are very high compared to a voltage (a few $\mu$V–a few hundreds of $\mu$V) sensed at a sensor, there have been many researches for minimizing the noise.

Referring to FIGS. 1A–1D in the related art, though elimination of the mechanical coupling is simple by heavy doping of the signal line of the piezoresistor running under the piezoactuator with impurity ions, elimination of the electric coupling is difficult.

Therefore, for elimination of the electric coupling, either a correcting circuit is provided separately, or a complicated circuit and a lock-in amplifier are fitted to a measuring terminal.

However, because those additional devices act as fatal defects in view of degrees of integrity and speed when the cantilever is used in other field of application, and, particularly, pushes up unit cost of the AFM, a cantilever is in need, which can prevent the electric coupling between the sensor signal and the actuator signal by using a more simple method.

SUMMARY OF THE INVENTION

Accordingly, the present invention is directed to a cantilever for an SPM that substantially obviates one or more of the problems due to limitations and disadvantages of the related art.

An object of the present invention is to provide a cantilever for an SPM, which can minimize noise occurred by an electric coupling between input/output signals of a sensor and an actuator.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the cantilever for a scanning probe microscope (SPM) includes a substrate having a tip, (e.g., piezoelectric actuator) on the substrate movable in response to an external electric signal, and a sensor formed around the piezoactuator so as not to overlap with the piezoactuator.

The sensor includes a sensing part formed in a surface of the substrate between the piezoactuator and the tip for sensing a signal, and a signal transmitting part formed at least on one side of the piezoactuator so as not to overlap with the piezoactuator and so as to be connected to the sensing part electrically, for transmitting the signal sensed at the sensing part.

The cantilever for an SPM further includes an impurity region in the surface of the substrate in a region having the tip formed therein, and a metal line formed so as not to overlap with the piezoactuator and so as to be in contact with the impurity region for applying an electric signal thereto.

In another aspect of the present invention, there is provided a cantilever for an SPM including a first conductive type substrate having a fixed part and a driving part, a base under the fixed part of the substrate, a tip on the substrate in the driving part, an insulating film on the substrate, at least one piezoactuator on the insulating film movable in response to an external electric signal, a sensing part formed by doping a second conductive type impurity ions in a surface of the substrate between the piezoactuator and the tip, and a signal transmitting part formed of a second conductive type impurity ions doped in the surface of the substrate at least on one side of the piezoactuator so as not to overlap with the piezoactuator and so as to be connected to the sensing part electrically, for transmitting the signal sensing part.

The signal transmitting part has a high concentration of the second conductive type impurity ions, and the sensing part has a low concentration of the second conductive type impurity ions.

A cantilever for an SPM further includes a heavily doped second conductive type impurity region in the surface of the first conductive type substrate in a region having the tip formed therein, and a metal line formed in contact with the heavily doped second conductive type impurity region for applying an electric signal thereto.

A cantilever for an SPM further includes a heavily doped first conductive impurity region formed in the surface of the first conductive type substrate in the fixed part, a contact hole in the insulating film, and a metal thin film electrically connected to the heavily doped first conductive type impurity ion region through the contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1A:
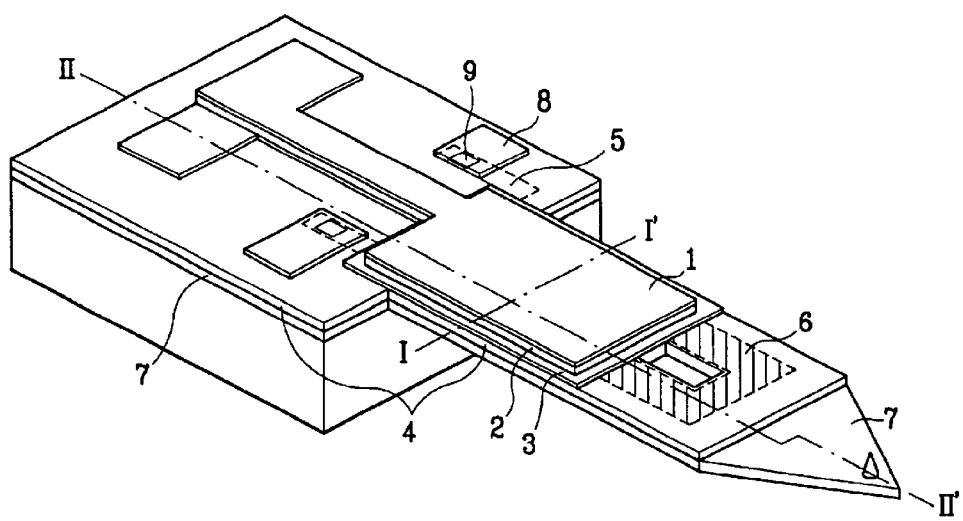
FIG. 1A illustrates a perspective view of a related art cantilever having piezoresistor sensors and piezoelectric actuators integrated thereon.
Figure 1B:
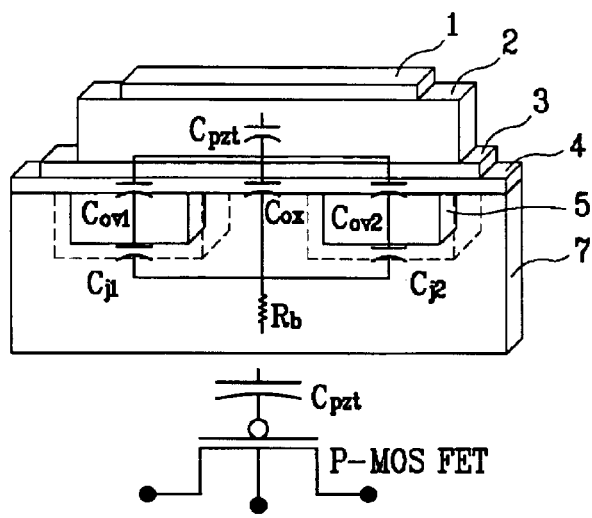
FIG. 1B illustrates a section across a line I—I in FIG. 1A.
Figure 1C:
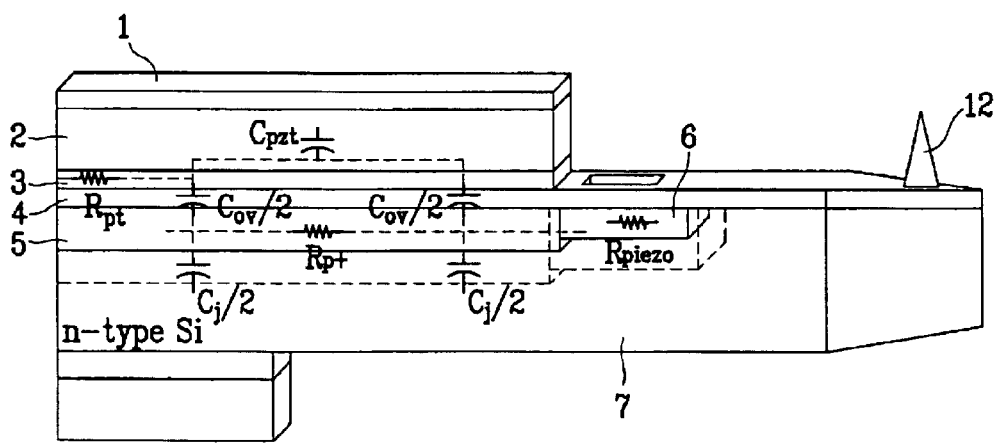
FIG. 1C illustrates a section across a line II—II in FIG. 1A.
Figure 1D:
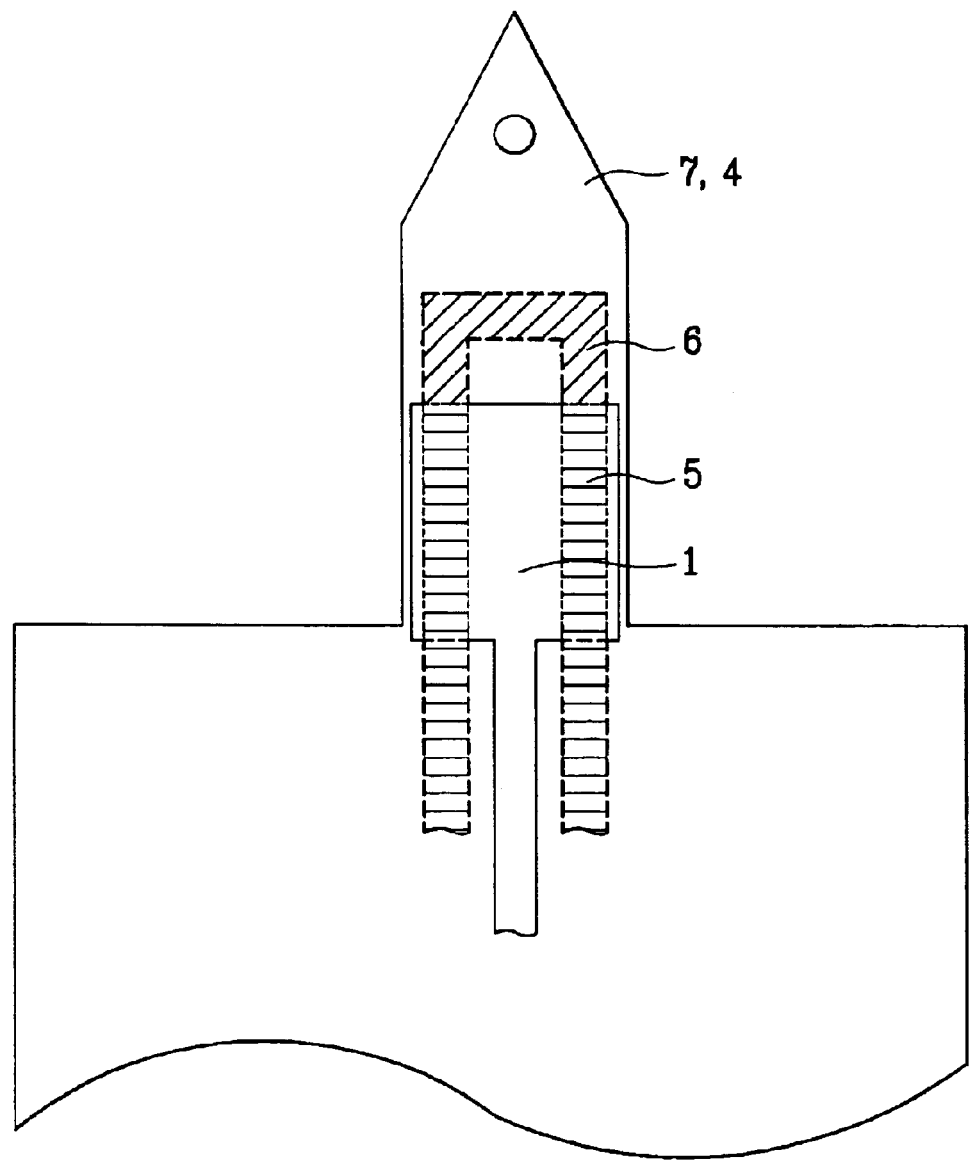
FIG. 1D illustrates a plan view of FIG. 1A.

In general, as shown in FIGS. 1B–1C, in a cantilever having piezoresistor sensors and piezoactuators (e.g., piezoelectric actuators) integrated thereon, the greater parasitic capacitances Cov1, and Cov2 caused by a lower electrode 3 of an actuator and a sensing signal transmitting part 5, and a resistance Rp+ of the sensing signal transmitting part 5, the greater the electric coupling.

Therefore, the present invention suggests arranging that no lower electrode of the actuator and the sensing signal transmitting part overlap, for minimizing the parasitic capacitances caused by the lower electrode of the actuator and the sensing signal transmitting part. Moreover, in order to minimize the resistance of the sensing signal transmitting part, the sensing signal transmitting part is heavily doped, or formed of a metal wire.

FIGS. 2–9 illustrate plan views of cantilevers for SPMs in accordance with first to eighth preferred embodiments of the present invention, respectively. Since the cantilever of the present invention is similar to the related art cantilever, the present invention will be explained putting emphasis on parts different from the related art.

First Embodiment

Figure 2A:
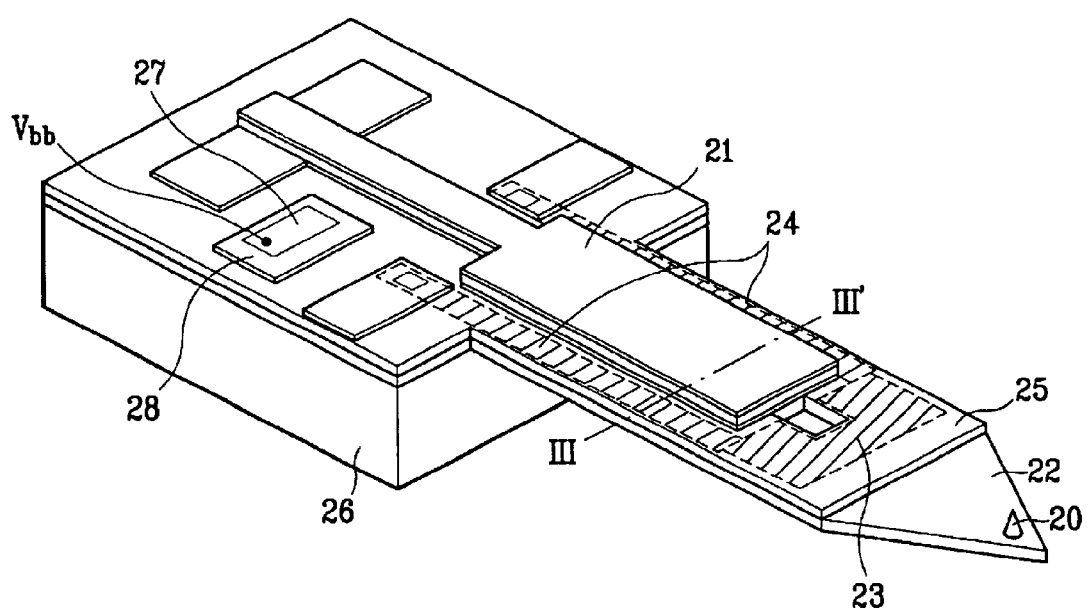
FIGS. 2–9 illustrate cantilevers for SPMs in accordance with first to eighth preferred embodiments of the present invention, respectively.
Figure 2B:
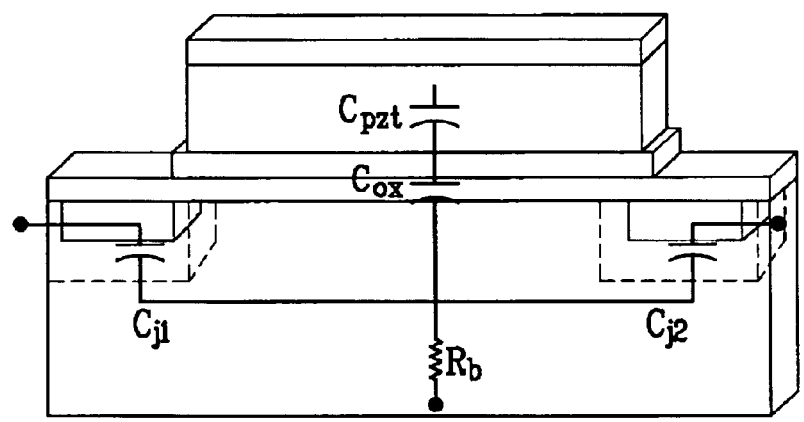
Figure 2C:
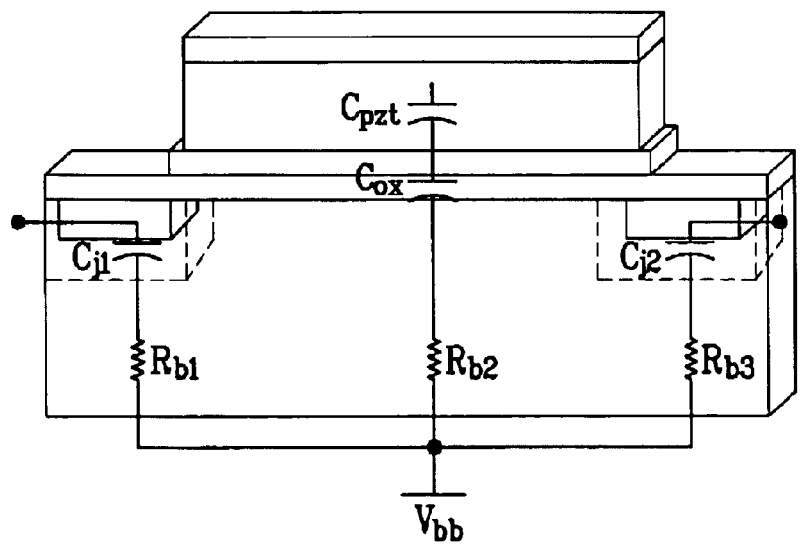
Figure 2D:
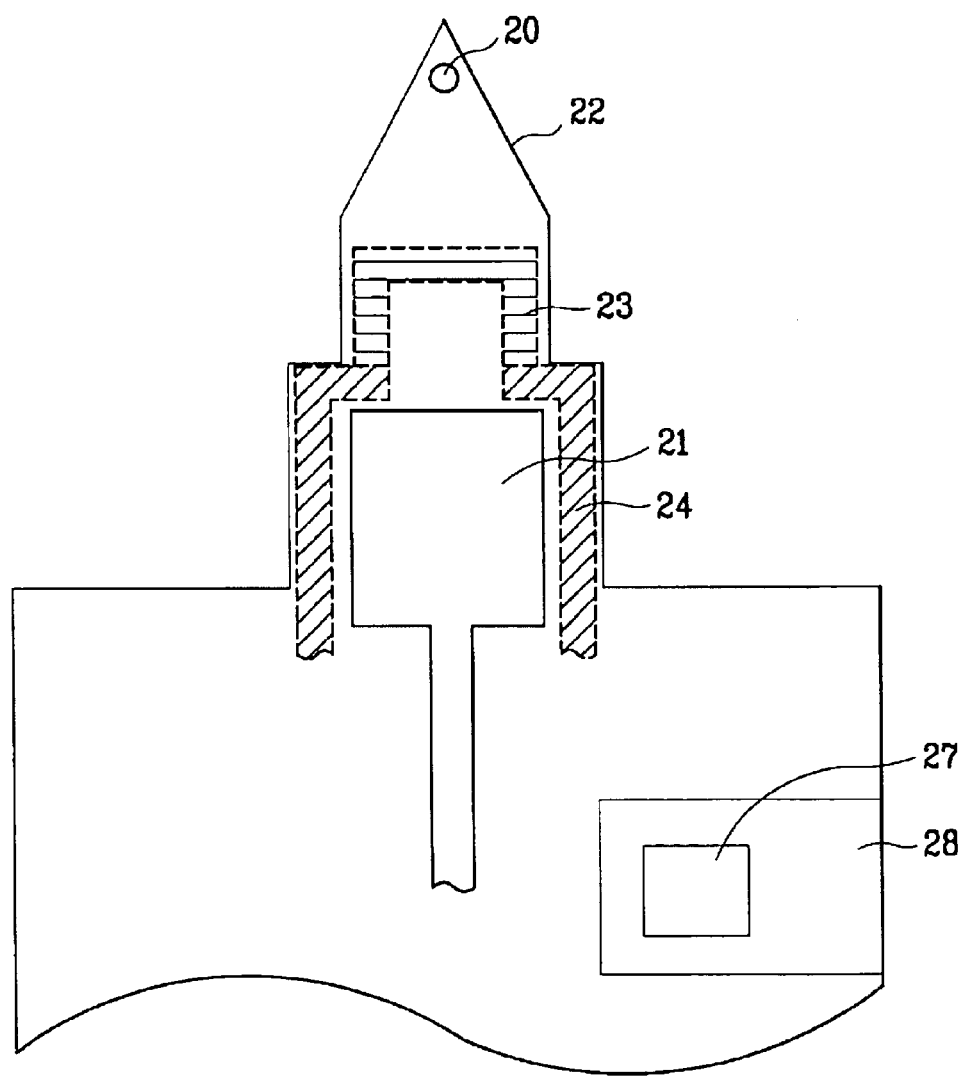

FIG. 2A illustrates a perspective view of a cantilever in accordance with a first preferred embodiment of the present invention, FIGS. 2B–2C illustrate sections across a line III—III in FIG. 2A, and FIG. 2D illustrates a plan view of FIG. 2A.

Referring to FIGS. 2A–2D, the cantilever in accordance with a first preferred embodiment of the present invention includes an n type silicon substrate 22 having a tip 20 at an end part thereof and an insulating film 25 formed thereon, and a piezoactuator 21 having a structure, that can comprise a lower electrode, ferroelectrics, and an upper electrode that is formed on the insulating film 25 movable in response to an external electric signal.

There is a sensing part 23 in a surface of the substrate in front of the piezoactuator 21 doped with boron, which is electrically connected to a sensing signal transmitting part 24 heavily doped with boron in the surface of the substrate on both sides of the piezoactuator 21. The sensing signal transmitting part 24 is heavily doped with boron for minimizing a resistance of the sensing signal transmitting part 24.

Thus, as the sensing signal transmitting part 24 is on both sides of the piezoactuator 21. The sensing signal transmitting part 24 and the piezoactuator 21 does not overlap, thereby permitting a reduction of a parasitic capacitor Cox consisting of the lower electrode of the piezoactuator 21—the insulating film 25—the silicon substrate 22 as shown in FIG. 2B.

Or, alternatively, referring to FIG. 2A, the cantilever in accordance with a first preferred embodiment of the present invention may include a heavily doped n type impurity region in a part of an n type silicon substrate 22 on a base 26, and a metal thin film 28 on an insulating film 25 in contact with the heavily doped n type impurity region through a contact hole 27 in the insulating film 25. That is, the heavily doped n type substrate 22 and the metal thin film 28 make ohmic contact.

In this instance, upon application of Vbb to the metal thin film 28, the n type silicon substrate 22, the p type sensing part 23, and the p type sensing signal transmitting part 24 form a reverse direction p-n diode.

Referring to FIG. 2C, consequently, the parasitic capacitor Cj between the sensing signal transmitting part 24 and the silicon substrate 22 is reduced, and even the coupling voltage can be reduced as the coupling voltage escapes to Vbb.

Second Embodiment

Figure 3:
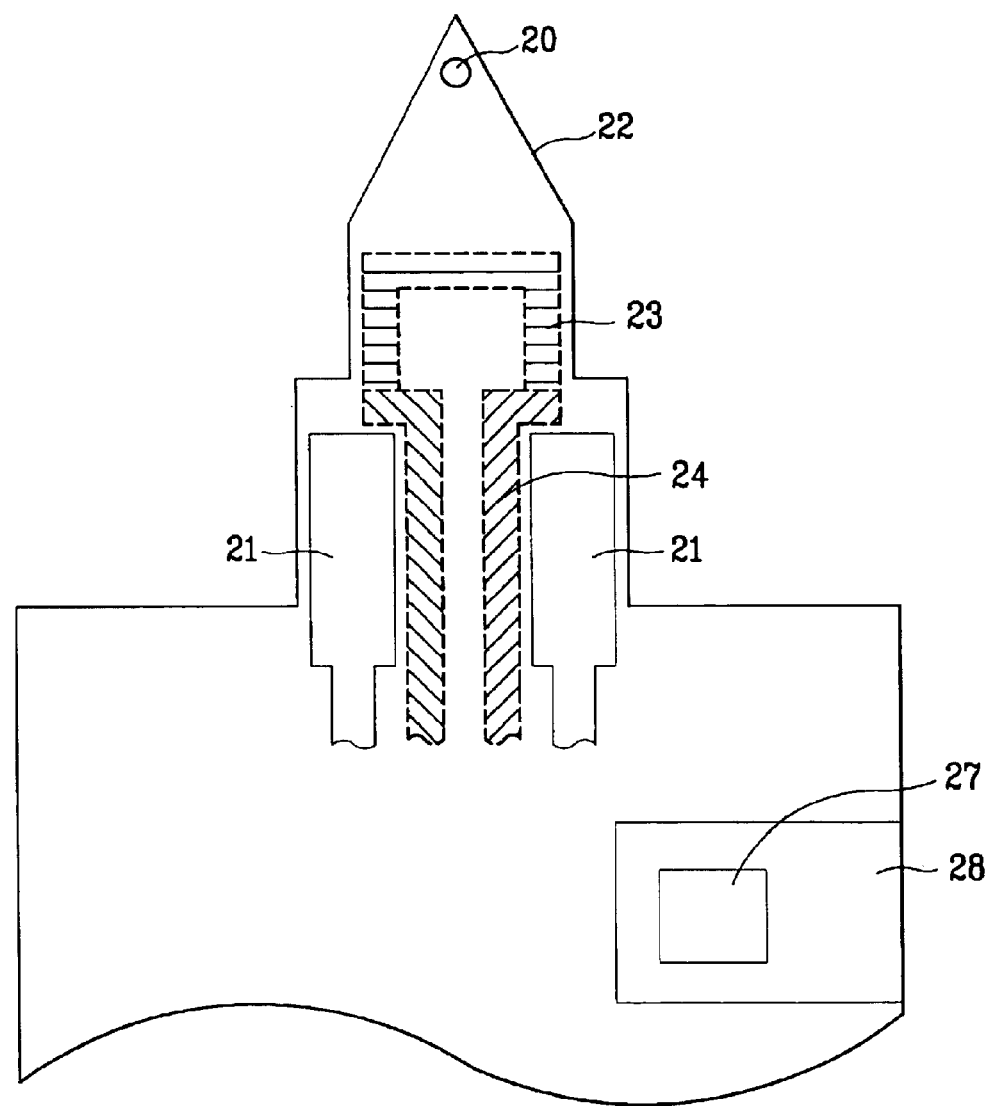

Referring to FIG. 3, the cantilever in accordance with a second preferred embodiment of the present invention includes a silicon substrate 22 having a tip 20 at an end part thereof and an insulating film 25 (not shown) formed thereon, and piezoactuators 21 each having a structure of a lower electrode—ferroelectrics—an upper electrode formed on the insulating film movable in response to an external electric signal. In this instance, a number of the piezoactuators 21 are two formed at edges of the substrate 22.

There is a sensing part 23 doped with boron in a surface of the substrate in front of the piezoactuators 21, and there is a sensing signal transmitting part 24 heavily doped with boron in a surface of the substrate between the piezoactuators 21 and electrically connected to the sensing part 23.

Alike the first embodiment, the sensing signal transmitting part 24 and the piezoactuators 21 do not overlap as the sensing signal transmitting part 24 is formed between the piezoactuators 21, leading to minimize the parasitic capacitance, permitting to reduce an unnecessary coupling.

Moreover, alike the first embodiment, a metal thin film 28 may be formed for application of Vbb.

Third Embodiment

Figure 4:
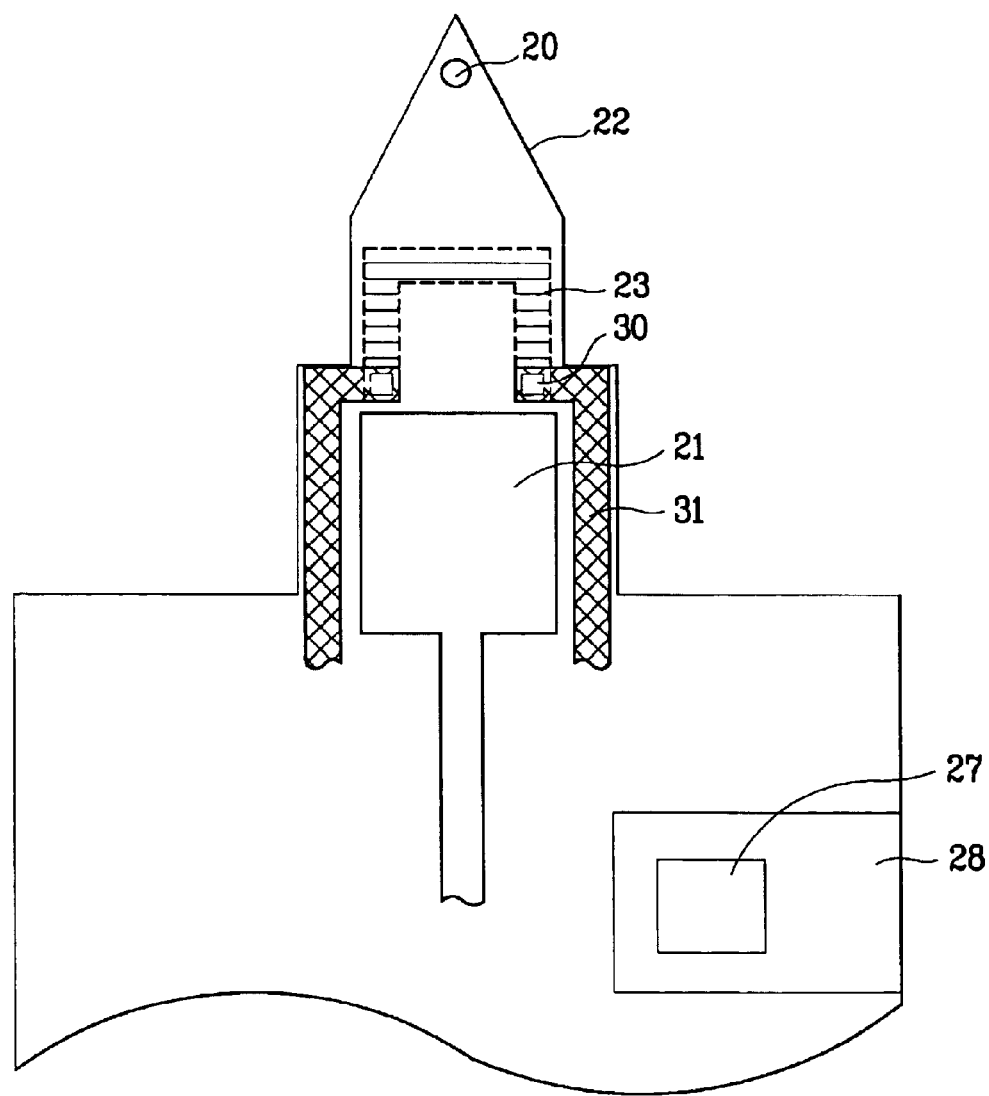

Referring to FIG. 4, the cantilever in accordance with a third preferred embodiment of the present invention is similar to the first preferred embodiment of the present invention.

A difference lies in that the sensing signal transmitting part 31 for electrical connection to the sensing part 23 is formed of, not the heavy impurity doped in the substrate 22, but a metal wire formed on the insulating film (not shown) in contact with the sensing part 23 through a contact hole 30, as a resistance of the silicon substrate is higher than metal.

That is, alike the first embodiment, the third embodiment employs a sensing signal transmitting part 31 formed of, not the heavily doped boron, but a metal, such as Pt or Al, for minimizing a resistance, thereby reducing the electrical coupling.

Fourth Embodiment

Figure 5:
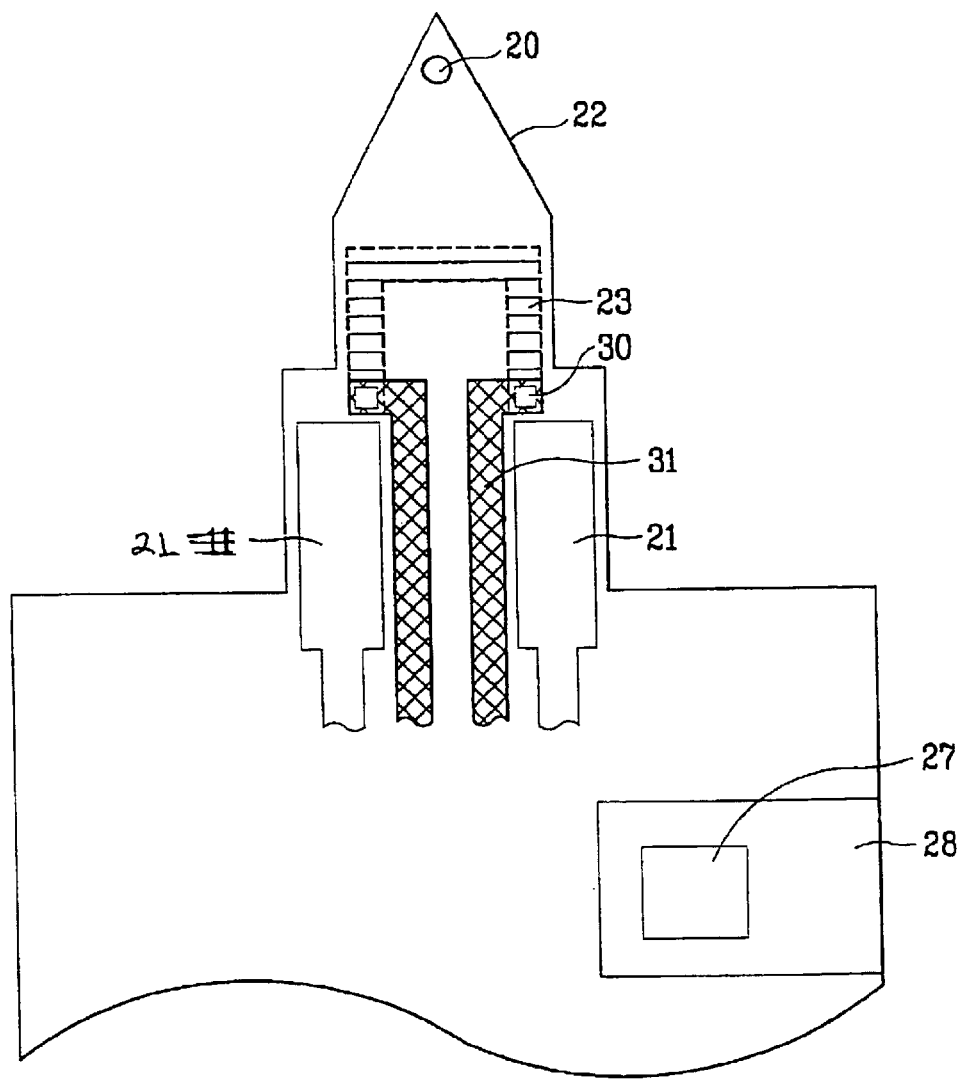

Referring to FIG. 5, since the cantilever in accordance with a fourth preferred embodiment of the present invention is similar to the second preferred embodiment of the present invention, a detailed explanation thereof will be omitted.

That is, alike the second embodiment, instead of the signal transmitting part 24 formed of the heavily doped boron, the signal transmitting part 31 formed of Pt or Al is employed, for minimizing a resistance, thereby reducing electrical coupling.

Fifth Embodiment

The cantilever in accordance with a fifth preferred embodiment of the present invention for use in an FEM (Electrostatic Force Microscopy), a nano-lithography, or the like, mostly, has a difference from the other embodiments in that it is required to apply an electric signal to the tip of the cantilever.

Figure 6:
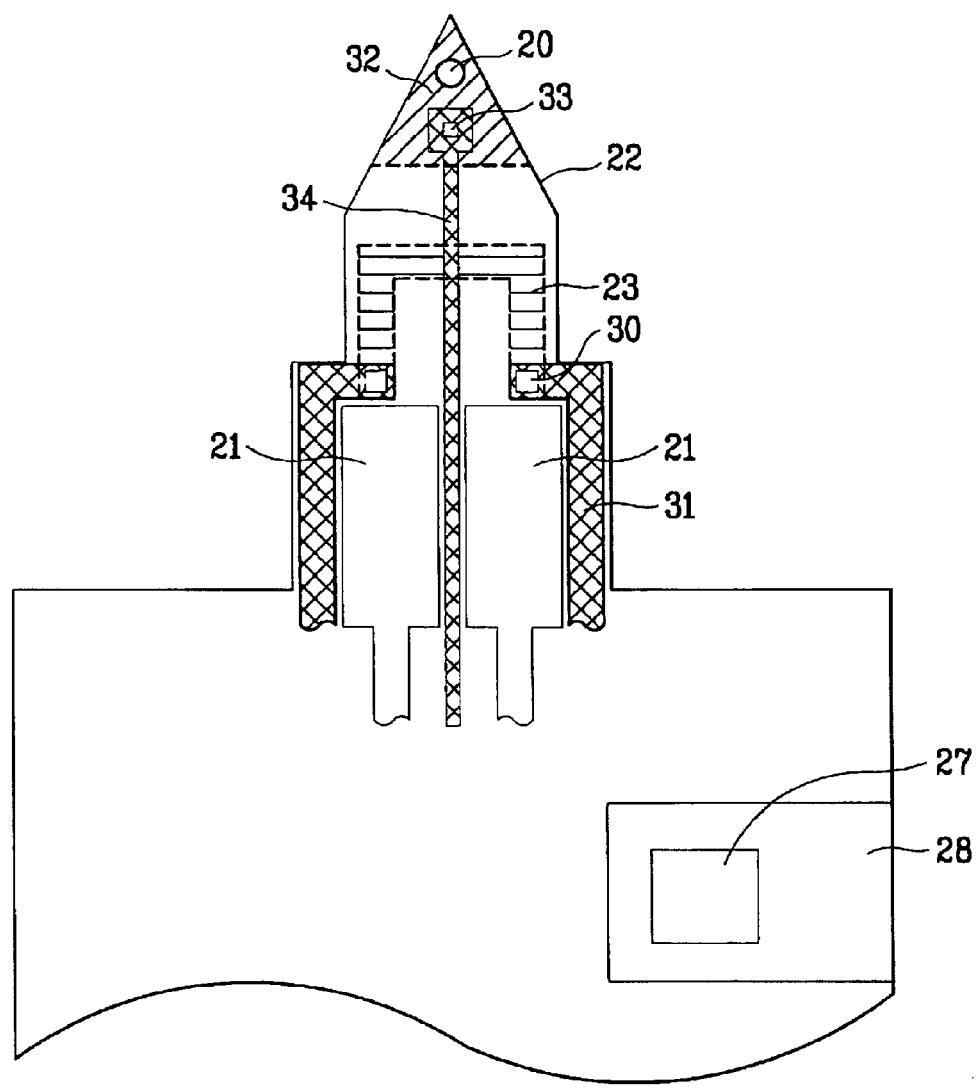

Therefore, referring to FIG. 6, there is an insulating film (not shown) on the silicon substrate 22 having a tip 20 at an end part thereof, and there are piezoactuators 21 each having a structure of a lower electrode—ferroelectrics—an upper electrode on the insulating film movable in response to an external electric signal. A number of the piezoactuators 21 are two at edges of the substrate 22.

There is a region 32 of heavily doped boron in a surface of the substrate in a part of the tip 20, and there is a sensing part 23 doped with boron in a surface of the substrate in front of the piezoactuator 21.

Moreover, there are sensing signal transmitting parts 31 of Pt, Al, or the like on the insulating film on sides of an outer part of the piezoactuator 21 each electrically connected to the sensing part 23 through a contact hole 30, and there is a metallic signal line 34 between the piezoactuators 21 connected to the doped region 32 through a contact hole 33.

Alike the other embodiments, the cantilever in accordance with a fifth preferred embodiment of the present invention has the lower electrodes of the piezoactuators 21 and the sensing signal transmitting part 31 arranged so as not to be overlapped with each other, for minimizing a parasitic capacitance, and the sensing signal transmitting part 31 of a metal wire for minimizing a resistance of the sensing signal transmitting part, thereby reducing the electric coupling.

Sixth Embodiment

Figure 7:
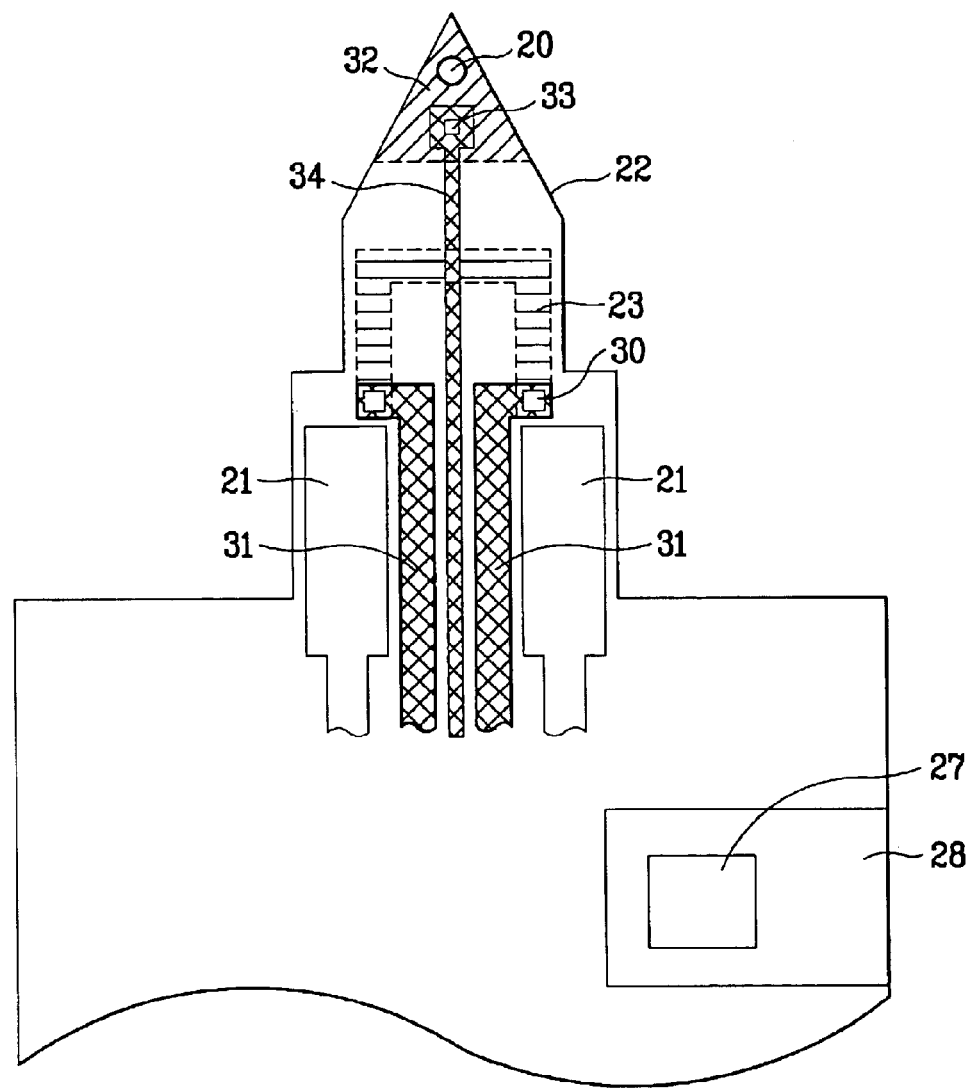

Referring to FIG. 7, the cantilever in accordance with a sixth preferred embodiment of the present invention is identical to the fourth embodiment of the present invention except that there is a region 32 of heavily doped boron in a surface of a substrate in a part of a tip 20, and there is a metal signal line 34 between the sensing signal transmitting parts 31 electrically connected to the region 32 of heavily doped boron through a contact hole 33.

Seventh Embodiment

Figure 8:
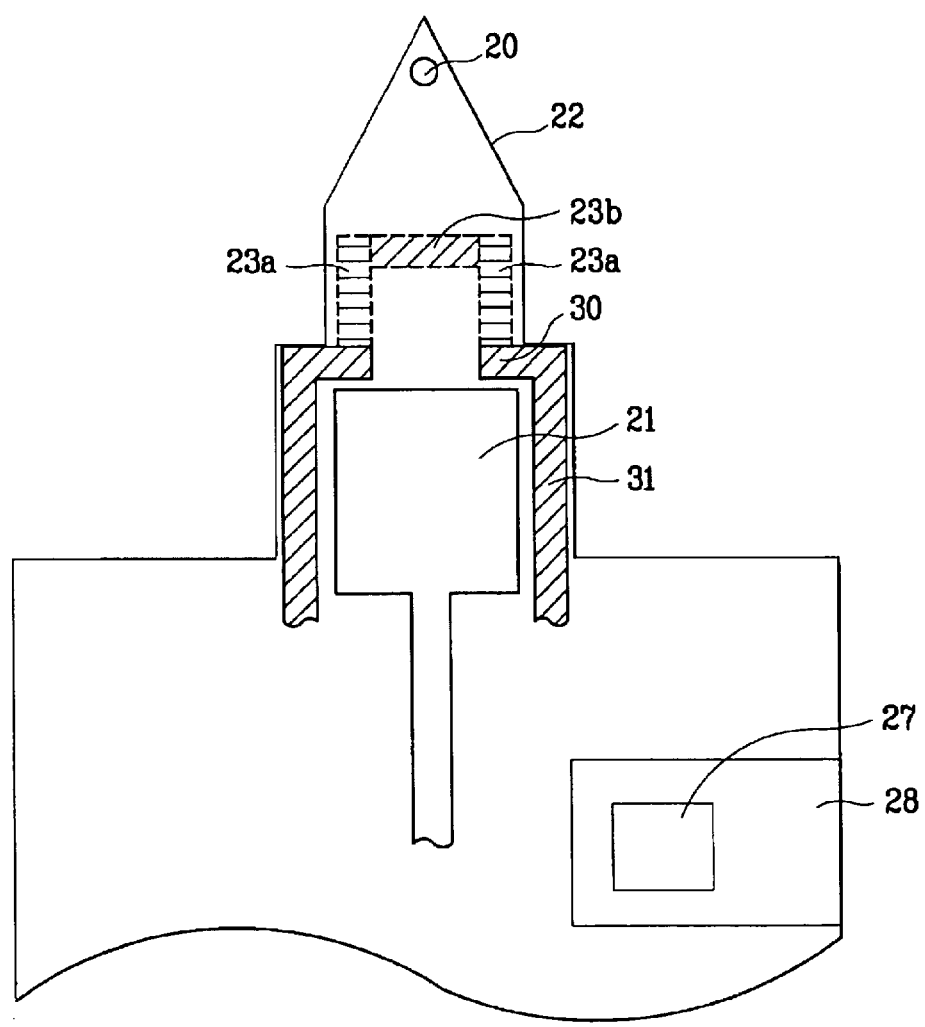

Referring to FIG. 8, the cantilever in accordance with a seventh preferred embodiment of the present invention has a sensing part 23 divided into a first region 23a of lightly doped impurity ions, and a second region 23b of heavily doped impurity ions. The first and second regions are electrically connected.

In a case of a silicon piezoresistive sensor, a stress applied to the cantilever exhibits as a change of a resistor. A relative variation of the resistance can be expressed as the following equation.

$$\Delta R/R = \pi_L \sigma + \pi_T \sigma,$$

Where, $\pi_L$ denotes a longitudinal piezoresistive coefficient, a value when the stress and the resistance are horizontal, and $\pi_T$ denotes a transversal piezoresistive coefficient, a value when the stress and the resistance are vertical. $\sigma$ denotes a mechanical stress applied to an object. When the silicon substrate is of a p type, and <110> orientation doping has a concentration of approx. $10^{17} cm^{-3}$, $\pi_L$ is in a range of $71.8 \times 10^{-11} Pa^{-1}$, and $\pi_T$ is in a range of $-66.3*10^{-11}Pa^{-1}$. Eventually, $\pi_L$ and $\pi_T$, sensed values, offset each other, to drop a sensitivity.

As shown in FIG. 8, in the sensing part 23, the stress and the resistance are horizontal in the first region 23a, and the stress and the resistance are vertical in the second region 23b. Therefore, if the first and second regions 23a and 23b have the same concentrations of boron doped therein respectively, the sensitivity becomes poor.

For reducing this phenomenon, in the seventh embodiment of the present invention, the second region 23b is heavily doped with boron for reducing absolute values of the resistance and the piezoresistive coefficient, thereby enhancing the sensitivity.

Eighth Embodiment

Figure 9:
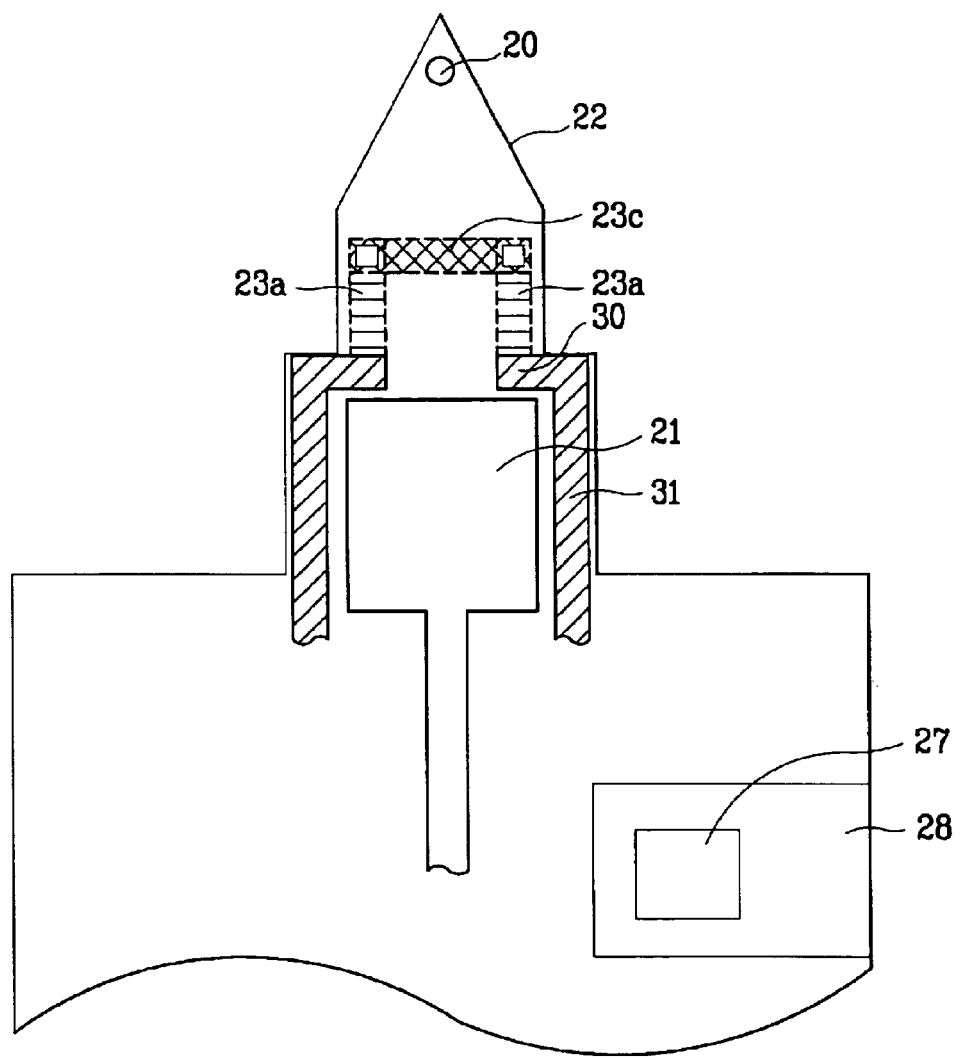

Referring to FIG. 9, the cantilever in accordance with an eighth preferred embodiment of the present invention has a structure in which a second region 23b of a sensing part 23 is, not doped with boron, but the boron is replaced with a metal line.

In general, as metal has a piezoresistive coefficient smaller by 100 times than silicon, metal can improve sensitivity, effectively.

Other than this, the present invention may be varied depending on application. Moreover, the first to eighth embodiments may make different combinations, to fabricate various cantilevers of the present invention. The sensing part 23, the sensing signal transmitting part 24, and the doped region 32 having the tip formed thereon are formed by injecting second conductive type impurities into a first conductive type substrate, and the metal thin film 28 is formed by injecting first conductive type impurities into a first conductive type substrate. Or, alternatively, the first conductive type impurity may be injected into a second conductive substrate, as case demands.

Figure 10:
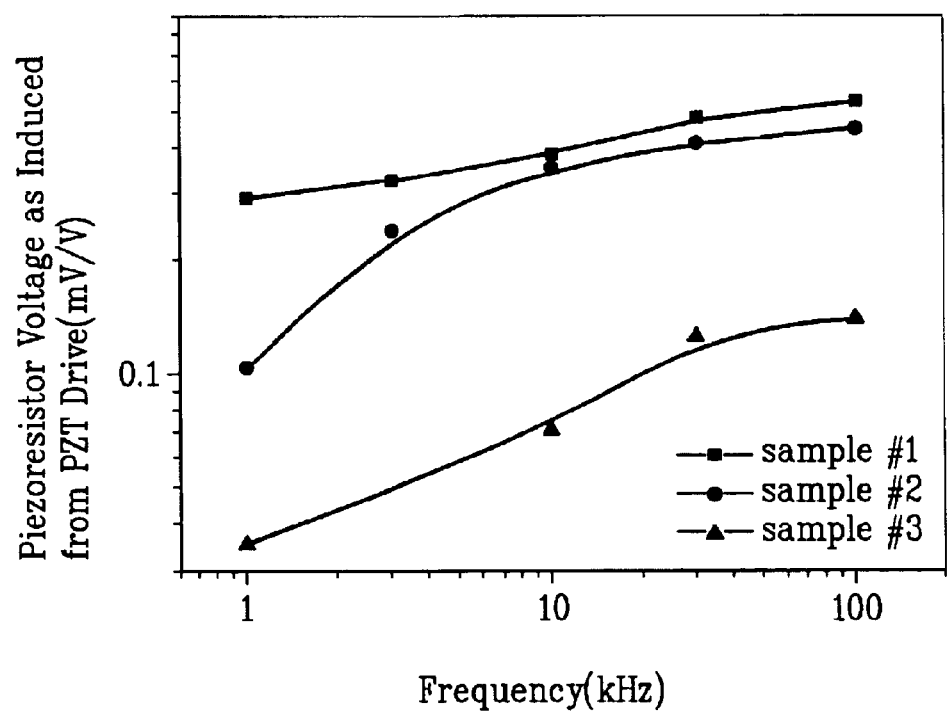
FIG. 10 illustrates a graph showing comparison of coupling voltages of the related art and the present invention.
Figure 11:
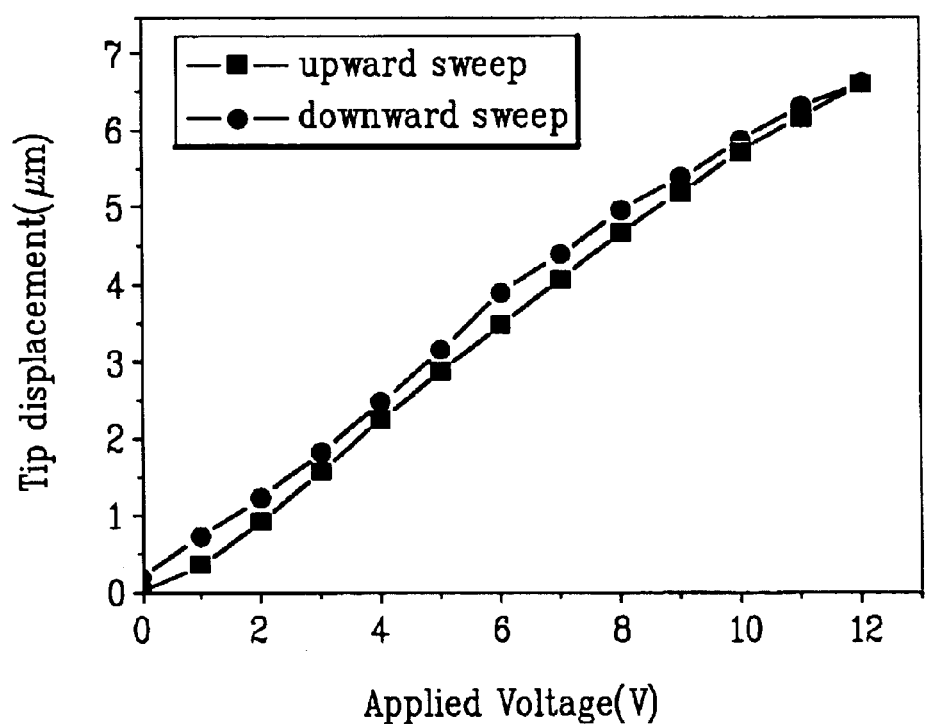
FIG. 11 illustrates a graph showing displacement of a cantilever of the present invention.

FIG. 10 illustrates a graph showing comparison of coupling voltages of the related art and the present invention, and FIG. 11 illustrates a graph showing displacement of a cantilever of the present invention. As shown in FIG. 10, a sample #1 represents a related art cantilever having the piezoactuator and the signal transmitting part overlapped thereon, a sample #2 represents a cantilever of the present invention having the signal transmitting part doped with boron heavily, and a sample #3 represents a cantilever of the present invention having the signal transmitting part formed of metal.

Referring to FIG. 10, it can be noted that the coupling voltage of the sample #2 or #3 is substantially smaller that the sample #1 of the related art.

Moreover, referring to FIG. 11, it can be noted that the cantilever is operative well even if the actuator of the present invention is employed. Therefore, of course the cantilever for an SPM of the present invention is applicable to the fast AFM as well as to a data storage system, or nanolithography.

The structure basis separation of the sensor from the signal line of the actuator minimizes coupling between a sensor signal and an actuator signal, thereby permitting to reduce noise in a sensing signal, that allows a very simple circuit terminal for comparing, and amplifying the sensing signal.

It will be apparent to those skilled in the art that various modifications and variations can be made in the cantilever for a scanning probe microscope (SPM) of the present invention without departing from the spirit or scope of the invention. Thus, it is intended that the present invention cover the modifications and variations of this invention provided they come within the scope of the appended claims and their equivalents.

What is claimed is:

1. A cantilever for a scanning probe microscope (SPM) comprising:
   a substrate having a tip;
   an insulating film on the substrate;
   piezoelectric actuator on the insulating film movable in response to an external electric signal;
   a sensor formed adjacent the piezoelectric actuator so as not to overlap with the piezoelectric actuator;
   a sensor lead formed by doping at least one portion of the substrate so that the sensor lead is capacitively isolated from the piezoelectric actuator, wherein the sensor lead is configured to transmit a signal from the sensor; and
   a metal thin film formed on the insulating film and in communication with the substrate such that when a voltage is applied thereto capacitive coupling between the substrate and the sensor lead is reduced.

2. The cantilever as claimed in claim 1, wherein the sensor comprises a piezoresistive sensor formed on the substrate between the piezoelectric actuator and the tip.

3. The cantilever as claimed in claim 1, wherein the sensor has impurity ions doped therein.

4. The cantilever as claimed in claim 1, wherein the sensor lead is formed in a surface of the substrate or on the substrate.

5. The cantilever as claimed in claim 1, wherein the sensor comprises a piezoresistive sensor formed of impurity ions doped in the substrate.

6. The cantilever of claim 1, wherein the piezoelectric actuator is configured to actuate the tip.

7. The cantilever of claim 1, wherein the sensor and the sensor lead are disposed in the same plane.

8. The cantilever of claim 1, wherein the piezoelectric actuator comprises a ferroelectric layer disposed between two planar electrodes.

9. The cantilever of claim 1, wherein the sensor lead is formed on a portion of the substrate that is not overlapped by the piezoelectric actuator such that the sensor lead is capacitively isolated from the piezoelectric actuator.

10. The cantilever of claim 1, wherein the sensor lead extends from the sensor down two sides of the piezoelectric actuator.

11. The cantilever of claim 1, wherein when a voltage is applied the metal thin film a reverse direction p-n diode is formed by the substrate, the senor, and the sensor lead.

12. The cantilever of claim 1, wherein the metal thin film communications with substrate via a contact hole formed on the insulating film.

13. A cantilever for an SPM comprising:
   a substrate of a first conductive type having a fixed part and a driving part;
   a base under the fixed part of the substrate;
   a tip on the substrate in the driving part;
   an insulating film on the substrate;
   at least one piezoelectric actuator on the insulating film movable in response to an external electric signal;
   a sensor formed on a region of the substrate between the piezoelectric actuator and the tip;
   a sensor lead formed on a region of the substrate such that the sensor lead is capacitively isolated from the piezoelectric actuator, wherein the sensor lead is configured to transmit a signal from the sensor; and
   a metal thin film formed on the insulating film and in communication with the substrate such that when a voltage is applied thereto capacitive coupling between the substrate and the sensor lead is reduced.

14. The cantilever as claimed in claim 13, wherein the sensor lead comprises a high concentration of a second conductive type impurity ions, and the sensor comprises a low concentration of the second conductive type impurity ions.

15. The cantilever as claimed in claim 14, wherein the impurity ions are boron.

16. The cantilever of claim 13, wherein the sensor is configured to sense a variable amount of a signal applied to the substrate by a surface.

17. The cantilever of claim 13, wherein the piezoelectric actuator is configured to actuate the tip.

18. The cantilever of claim 13, wherein the sensor comprises impurity ions doped into the substrate.

19. The cantilever of clailm 13, wherein the sensor and the sensor lead are disposed in the same plane.

20. The cantilever of claim 13, wherein the piezoelectric actuator comprises a ferroelectric layer disposed between two planar electrodes.

21. The cantilever as claimed in claim 13, further comprising:

a contact hole formed in a portion of the insulating film over the sensor lead; and a second metal thin film is formed over and in the contact hole such that the metal thin film is coupled to the sensor lead.

22. The cantilever as claim 13, wherein the sensor lead is formed on a region of the substrate that is not overlapped by the piezoelectric actuator.

23. The cantilever as claimed in claim 13, wherein the sensor lead extends from the sensor down two sides of the piezoelectric actuator.

24. The cantilever as claimed in claim 13, wherein when a voltage is applied the metal thin film a reverse direction p-n diode is formed by the substrate, the sensor, and the sensor lead.

25. The cantilever as claimed in claim 13, wherein the metal thin film communicates with the substrate via a contact hole formed in the insulating film.

* * * * *